US006315909B1

(12) United States Patent
Hoots et al.

(10) Patent No.: US 6,315,909 B1
(45) Date of Patent: Nov. 13, 2001

(54) USE OF CONTROL MATRIX FOR COOLING WATER SYSTEMS CONTROL

(75) Inventors: John E. Hoots, St. Charles; Paul R. Young, Wheaton; David P. Workman, Naperville, all of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/562,397

(22) Filed: May 1, 2000

(51) Int. Cl.$^7$ ........................................ B01D 17/12
(52) U.S. Cl. ........................ 210/745; 210/696; 210/739; 422/14; 436/164; 436/172; 700/273
(58) Field of Search ...................... 210/94, 143, 696, 210/739, 745; 422/14, 62, 82.07, 82.08; 436/164, 172; 700/266, 273; 706/15, 21, 23

(56) References Cited

U.S. PATENT DOCUMENTS

| | | |
|---|---|---|
| 4,783,314 | 11/1988 | Hoots et al. . |
| 4,813,973 | 3/1989 | Winnik et al. . |
| 4,999,456 | 3/1991 | Fong . |
| 5,043,406 | 8/1991 | Fong . |
| 5,128,419 | 7/1992 | Fong et al. . |
| 5,171,450 | 12/1992 | Hoots . |
| 5,360,549 | * 11/1994 | Mouche et al. ............... 210/696 |
| 5,408,022 | 4/1995 | Imazato et al. . |
| 5,435,969 | 7/1995 | Hoots et al. . |
| 5,581,459 | * 12/1996 | Enbutsu et al. . |
| 5,720,884 | 2/1998 | Wallace et al. . |
| 5,774,633 | * 6/1998 | Baba et al. . |
| 5,817,927 | 10/1998 | Chen et al. . |
| 5,855,791 | 1/1999 | Hays et al. . |
| 5,902,749 | 5/1999 | Lichtwardt et al. . |
| 5,943,662 | * 8/1999 | Baba et al. ............... 706/23 |
| 6,068,012 | 5/2000 | Beardwood et al. . |

FOREIGN PATENT DOCUMENTS 1141147 1/1969 (GB) .

OTHER PUBLICATIONS

"Water Treatment Dosage Control And Relationship To Performance", J. E. Hoots, Paper No. 260, Corrosion 95, NACE Int'l Annual Conference and Corrosion Show, pp. 260/1–260/11, undated.

(List continued on next page.)

Primary Examiner—Joseph W. Drodge
(74) Attorney, Agent, or Firm—Margaret M. Brumm; Thomas M. Breininger

(57) ABSTRACT

Described and claimed is a method of controlling a cooling water system in which control is based on information from a control Matrix applicable to the specific operating parameters of the cooling water system including:

(i) providing a suitable fluorometer, sufficient analytical devices and a suitable controller;

(ii) programming the suitable fluorometer and controller using planning information from a control Matrix for cooling water systems being treated with treatment programs selected from the group consisting of:

(d) stabilized phosphate,
(e) zinc, and
(f) all organic;

(iii) using the fluorometer and sufficient analytical devices to determine the status of system factors;

(iv) determining the pattern of changes in the readings from step (iii) over time;

(v) comparing the changes in readings in steps (iii) and (iv), with the information listed in the control Matrix to determine what corrective action(s) is recommended; and (vi) using the controller to automatically implement the corrective action(s).

1 Claim, 14 Drawing Sheets

Recommended Program Limits --- will be situation & treatment dosage-dependent

| Treatment Product Dosage/Actives | All-Organic | Zinc | Stabilized PO4 |
|---|---|---|---|
| Product Dosage (ppm product) | 30-120 (dispersant treatment), 40-60 (org. P treatment) | 30-155 (dispersant treatment), 3-150 (zinc treatment) | 20-160 (dispersant treatment), 75-100 (phosphate treatment) |
| Polymer | Verify polymer level | Verify polymer level | Verify polymer level |
| Org. P (ppm as PO4) | N/A? | | 4.8-7.2 |
| Zinc (ppm as Zn) | 1 | 10 | 10 |
| Ortho PO4 (ppm as PO4) | 4 | 35 | 55 |
| Inorganic P (ppm as PO4) | 3 | --- | --- |
| Condensed "Poly" PO4 (ppm as PO4) | --- | --- | >2 |
| Free residual chlorine (ppm as Cl2) | 0.2-0.5 | 0.2-0.5 | 0.2-0.5 |

| Water Quality | | | |
|---|---|---|---|
| pH | 8.5-9.2 | 7.2-9.0 | 6.8-8.0 |
| M-Alkalinity (ppm as CaCO3) | 250-500 | 50-400 | 15-200 |
| PO4 in makeup (ppm as PO4) | [4 - (PO4 from treatment)]/cycles | [35 - (PO4 from treatment)]/cycles | [55 - (PO4 from treatment)]/cycles |
| Microbio (CFU's/cm) | ≤10,000 | ≤10,000 | ≤10,000 |
| Cycles | depends on makeup water quality | depends on makeup water quality | depends on makeup water quality |
| Ca+2 (ppm as CaCO3) | 50-850 | 15-1200 | 15-1500 |
| Mg+2 (ppm as CaCO3) | dependent on pH/SiO2 | dependent on pH/SiO2 | dependent on pH/SiO2 |
| Total Hardness (ppm as CaCO3) | dependent on Ca+2 + Mg+2 | dependent on Ca+2 + Mg+2 | dependent on Ca+2 + Mg+2 |
| Iron (ppm as Fe) | 4 | 8 | 8 |
| Suspended Solids (or Turbidity) | 50 NTU | 75 NTU | 75 NTU |
| Al+3 (ppm as Al) | 0.5 | 2 | 2 |
| Boiler blowdown as Makeup | may contain polymer incompatible w/CW | may contain polymer incompatible w/CW | may contain polymer incompatible w/CW |

| System Operation | | | |
|---|---|---|---|
| HTI (hours) | 60 | 225 | 250 |
| Highest H2O Temp. @ H-E Outlet (deg F) | 135 | 180 | 180 |

OTHER PUBLICATIONS

"High Cycle Cooling Tower Operation: Hurdles And Solutions", J.E. Hoots, et al., IWC–99–48, pp. 388–397, undated.

"The Use of Coumarin Derivatives In The Preparation Of Fluorescence–Labeled Poly[N–2–(Hydroxypropyl)methacrylamide]", Jiri Krejcoves, et al., Collection Czechoslov. Chem. Commun. [vol. 45] [1980], pp. 727–731.

"Expert System For Water Treatment", FYI, Chemical Engineering Progress, Undated.

"Application Of Expert Systems For Cooling Water Monitoring", Paul A. Burda, et al, Corrosion 95, NACE Int'l Annual Conf. And Corrosion Show, Paper No. 255, pp. 255/1–255/20, Undated.

"A New On–Line Monitoring And Control Capability For Cooling Water Programs", J. Richardson, et al., Cooling Tower Institute 1993 Annual Meeting, Technical Paper Number TP93–10, pp. 1–18.

"Approaches For Reducing Phosphorous In Cooling Water Programs", D. Hartwick, et al., Corrosion 96, Paper No. 605, pp. 605/1–605/21, Undated.

"Monitoring Polymeric Treatment Programs In Alkaline Cooling Water", Barbara E. Moriarty, et al., Presented At Corrosion '89 Meeting, Apr., 1989, pp. 1–14.

"A New Method To Control Cooling Water Chemistry", James R. Macdonald, et al., Presented At AICHE Conference, Apr., 1989.

"TRASAR™ Technology Shows Dramatic Improvement In Program Control At A Mid–South Chemical Plant", Nalco Chemical Co. Case Study, CH–209, 1988.

Nalco TRASAR™ Technology For Cooling Water Treatment, Nalco Chemical Co., Bulletin 154, 9/88.

"Systems Technology For Automated Cooling Water Control", Nalco Chemical Co., Bulletin 156, 10/88.

"Automated Monitoring and Control Feed Systems Designed To Help You Optimize Your Total Wet End Program", Nalco Chemical Co., Chem Mate™, Bulletin 230, 4/93.

* cited by examiner

FIG. 1A
Stablized Phosphate

| System Conditions Leading to Stress | Possible Performance Problem | tracer level | Polymer | Pyro-phosphate | Ortho-PO4 | HMDTMP (Phosphonate) | Triazoles | Corrective Actions |
|---|---|---|---|---|---|---|---|---|
| Loss of treatment feed | Scale & Corrosion | decrease | 1 | 1 | 1 | 1 | 1 | Fix pump, trim pump on greater % of time, fix dosage control equipment, slug-feed additional amount of treatment |
| Excessive overfeed of treatment | Scale & Corrosion | increase | 1 | 1 | 1 | 1 | 0 | Turn off treatment feed, increase blowdown/decrease cycles |
| Overfeed of product | Corrosion | increase | | | 1 | 0 | 1 | Turn off treatment feed, increase blowdown/decrease cycles |
| Overcycling (No change in MU water quality) | Scale, Degradation | 0 | 1 | 1 | 1 | 1 | 1 | Increase blowdown/decrease cycles, increase treatment dosage |
| Low cycles | Dissolution of existing scale | 0 | -1 | -1 | -1 | -1 | 0 | Decrease blowdown/decrease cycles, decrease treatment dosage |
| High pH | Scale | 0 | 1 | 1 | 1 | 1 | 0 | Fix acid pump/increase acid feed, decrease cycles/increase blowdown, increase treatment dosage |
| Low pH | Dissolution of existing scale/protective films | 0 | -1 | -1 | -1 | -1 | -1 | Fix acid pump/decrease acid feed, decrease cycles/increase blowdown |
| Low pH | Corrosion (should it occur) | 0 | 1 | 1 | 1 | 0 | 1 | Fix acid pump/decrease acid feed, decrease cycles/increase blowdown, increase treatment dosage |

FIG. 1B
Stabilized Phosphate

| System Conditions Leading to Stress | Possible Performance Problem | tracer level | Polymer | Pyro-phosphate | Ortho-PO4 | HMDTMP (Phosphonate) | Triazoles | Corrective Actions |
|---|---|---|---|---|---|---|---|---|
| High alkalinity | Scale | 0 | 1 | 1 | 1 | 1 |  | Fix acid pump/increase acid feed, decrease cycles/increase blowdown, increase treatment dosage |
| Low alkalinity | Corrosion | 0 | 1 | 1 | 1 | 0 | 0 | Fix acid pump/decrease acid feed, decrease cycles/increase blowdown, increase treatment dosage |
| High/Variable HTI | Degradation, scale & corrosion | 0 | 1 | 1 | 1 | 1 | 1 | Decrease cycles/increase blowdown, increase treatment dosage, use treatment w/less tendency to revert/degrade over time |
| Variable/High PO4 in MU | Scale | 0 | 1 | 0 | -1 | 0 | 0 | Decrease cycles/increase blowdown, increase dispersant polymer dosage |
| Iron contamination in MU | Fouling | 0 | 1 | 0 | 1 | 0 | 0 | Decrease cycles/increase blowdown, increase dispersant polymer dosage, contingency feed of iron dispersant |
| Boiler blowdown as MU | Scale | 0 | 1 | 0 | 1 | 0 | 0 | Decrease boiler blowdown to cooling tower, increase dispersant polymer dosage |
| Al carryover | Fouling | 0 | 1 | 0 | 1 | 0 | 0 | Increase dispersant polymer dosage, reduce Al content in makeup water |
| High suspended solids | Fouling | 0 | 1 | 0 | 0 | 0 | 0 | Increase dispersant polymer dosage, fix clarifier/adjust coagulant/flocculant feed rate, decrease cycles/increase blowdown |
| Over-chlorination (high residual) | Degradation, scale & corrosion | 0 | 1 | 0 | -1 | 1 | 1 | Increase treatment dosage, prevent halogen overfeed, decrease cycles/increase blowdown (as needed) |

FIG. 1C
Stablized Phosphate

| System Conditions Leading to Stress | Possible Performance Problem | tracer level | Polymer | Pyro-phosphate | Ortho-PO4 | HMDTMP (Phosphonate) | Triazoles | Corrective Actions |
|---|---|---|---|---|---|---|---|---|
| Recirculation water as chlorinator drive water | Degradation, scale & corrosion | 0 | 1 | 1 | -1 | 1 | 1 | Increase treatment dosage, change chorinator drive-water to makeup water |
| Microbiological upsets | Fouling, PO4/etc. metabolized | 0 | 1 | 1 | 1 | 0 | 1 | Increase treatment dosage, optimize microbio/biocide control |
| High heat flux, high skin or water temp. (skin >150F, water >120F) | Scale | 0 | 1 | 1 | 1 | 1 | 0 | Increase dispersant polymer dosage, fix any mechanical-design problems |
| Process Leaks | Fouling | 0 | 1 | 0 | 1 | 1 | 0 | Increase treatment dosage, eliminate process leaks, contingency feed supplemental oil dispersant, decrease cycles/increase blowdown |
| Process Leaks | Corrosion | 0 | 1 | 1 | 1 | 0 | 1 | Increase treatment dosage, eliminate process leaks, contingency feed supplemental oil dispersant, decrease cycles/increase blowdown |

FIG. 2A
Stablized Phosphate

| General Trends: | | | | | |
|---|---|---|---|---|---|
| Dispersant Polymer is consumed due to the following processes: | | | | | |
| - scaling | | adsorption | | | |
| - corrosion | | adsorption, precipitation | | | |
| - increase in suspended solids | | adsorption | | | |
| - increased scale-forming ions due | to makeup (iron, PO4, Al....) | adsorption, precipitation | | | |
| - excessive overfeed of halogen- | based biocides (e.g., chlorine) | degradation | | | |
| - excessive HTI | | adsorption/ precipitation/degradation | | | |
| | | | | | |
| Pyrophosphate is consumed due to the following processes: | | | | | |
| - reversion to ortho-PO4 | | degradation | | | |
| - mild steel corrosion | | adsorption/precipitation | | | |
| - scaling (?) | | adsorption/precipitation | | | |
| - excessive HTI | | adsorption/precipitation/degradation | | | |
| | | | | | |
| Orthophosphate is consumed due to the following processes: | | | | | |
| - scaling | | adsorption/precipitation | | | |
| - mild steel corrosion | | adsorption/precipitation | | | |
| - increased scale-forming ions due | to makeup (Fe, Al ions) | adsorption/ precipitation | | | |
| - microbio upsets | | metabolized into biomass | | | |
| - excessive HTI | | adsorption/ precipitation/degradation | | | |

FIG. 2B
Stablized Phosphate

| General Trends: | | | | | | | | | | | | | | |
|---|---|---|---|---|---|---|---|---|---|---|---|---|---|---|
| HMDTMP (phosphonate) is consumed due to the following processes: | | | | | | | | | | | | | | |
| - scaling | | | adsorption | | | | | | | | | | | |
| - reversion to ortho-PO4 | | | degradation | | | | | | | | | | | |
| - mild steel corrosion | | | adsorption/precipitation | | | | | | | | | | | |
| - excessive overfeed of halogen-based biocides (e.g., chlorine) | | | degradation | | | | | | | | | | | |
| - excessive HTI | | | adsorption/precipitation/degradation | | | | | | | | | | | |
| Triazole is consumed due to the following processes: | | | | | | | | | | | | | | |
| - excessive overfeed of halogen-based biocides (e.g., chlorine) | | | degradation | | | | | | | | | | | |
| - microbio upsets | | | metabolized by biomass | | | | | | | | | | | |
| - copper (alloy) corrosion | | | adsorption | | | | | | | | | | | |
| - excessive HTI | | | adsorption/degradation | | | | | | | | | | | |

FIG. 3A
Zinc

| System Conditions Leading to Stress | Possible Performance Problem | tracer level | Polymer | Zinc | PBTC | Ortho-PO4 | Triazoles | Corrective Actions |
|---|---|---|---|---|---|---|---|---|
| High pH/High alkalinity | Scale | 0 | 1 | 1 | 1 | 1 | 0 | Fix acid pump/increase acid feed, decrease cycles/ increase blowdown, increase treatment dosage |
| Excessive overfeed of treatment | Scale | increase | 1 | 1 | 0 | 1 | 0 | Turn off treatment feed, increase blowdown/decrease cycles |
| Variable/High PO4 in MU | Scale | 0 | 1 | 1 | 0 | -1 | 0 | Decrease cycles/increase blowdown, increase dispersant polymer dosage |
| Process Leaks | Fouling | 0 | 1 | 0 | 1 | 1 | 0 | Increase treatment dosage, eliminate process leaks, contingency feed supplemental oil dispersant, decrease cycles/increase blowdown |
| Microbiological upsets | Fouling, PO4 metabolized | 0 | 1 | 0 | 0 | 1 | 1 | Increase treatment dosage, optimize microbio/biocide control |
| Over-chlorination (high residual) | Degradation, scale & corrosion | 0 | 1 | 0 | 0 | 0 | 1 | Increase treatment dosage, prevent halogen overfeed, increase blowdown/decrease cycles (as needed) |
| Low pH | Dissolution of existing scale/protective films | 0 | -1 | -1 | -1 | -1 | -1 | Fix acid pump/decrease acid feed, decrease cycles/increase blowdown |
| Overcycling (No change in MU water quality) | Scale, Degradation | 0 | 1 | 1 | 1 | 1 | 1 | Increase blowdown/decrease cycles, increase treatment dosage |
| High/Variable HTI | Degradation, scale & corrosion | 0 | 1 | 1 | 1 | 1 | 1 | Decrease cycles/increase blowdown, increase treatment dosage, use treatment w/less tendency to revert/degrade over time |
| Loss of treatment feed | Scale & Corrosion | decrease | 1 | 1 | 1 | 1 | 1 | Fix pump, trim pump on greater % of time, fix dosage control equipment, slug-feed additional amount of product |
| Excessive overfeed of treatment | Corrosion | increase | 1 | 1 | 0 | 1 | 1 | Turn off treatment feed, increase blowdown/decrease cycles |

FIG. 3B
Zinc

| System Conditions Leading to Stress | Possible Performance Problem | tracer level | Polymer | Zinc | PBTC | Ortho-PO4 | Triazoles | Corrective Actions |
|---|---|---|---|---|---|---|---|---|
| Low pH/Low alkalinity | Corrosion (should it occur) | 0 | 1 | 1 | 0 | 1 | 1 | Fix acid pump/decrease acid feed, decrease cycles/increase blowdown, increase treatment dosage |
| Process Leak | Corrosion | 0 | 1 | 1 | 0 | 1 | 1 | Increase treatment dosage, eliminate process leaks, contingency feed supplemental oil dispersant, decrease cycles/increase blowdown |
| High heat flux, high skin or water temp. (skin >150F, water >120F) | Scale | 0 | 1 | 1 | 1 | 1 | 0 | Increase dispersant polymer dosage, fix any mechanical-design problems |
| Boiler blowdown as MU | Scale | 0 | 1 | 1 | 0 | 1 | 0 | Decrease boiler blowdown to cooling tower, increase dispersant polymer dosage |
| Al carryover | Fouling | 0 | 1 | 1 | 0 | 1 | 0 | Increase dispersant polymer dosage, reduce Al content in makeup water |
| High suspended solids | Fouling | 0 | 1 | 1 | 0 | 0 | 0 | Increase dispersant polymer dosage, fix clarifier/adjust coagulant/flocculant feed rate, decrease cycles/increase blowdown |
| Recirculation water as chlorinator drive water | Degradation, scale & corrosion | 0 | 1 | 0 | 1 | -1 | 1 | Increase treatment dosage, change chlorinator drive-water to makeup water |
| Iron contamination in MU | Fouling | 0 | 1 | 0 | 0 | 1 | 0 | Decrease cycles/increase blowdown, increase dispersant polymer dosage, contingency feed of iron dispersant |
| Low cycles | Dissolution of existing scale | 0 | -1 | -1 | -1 | -1 | 0 | Decrease blowdown/increase cycles, decrease treatment dosage |

FIG. 4A
Zinc

| General Trends: | | |
|---|---|---|
| Dispersant Polymer is consumed due to the following processes: | | |
| - scaling | adsorption | |
| - corrosion | adsorption, precipitation | |
| - increase in suspended solids | adsorption | |
| - increased scale-forming ions due to makeup (iron, PO4, Al, ...) | adsorption, precipitation | |
| - excessive overfeed of halogen based biocides (e. g. chlorine) | degradation | |
| - excessive HTI | adsorption/precipitation/degradation | |
| Zinc is consumed due to the following processes: | | |
| - mild steel corrosion | adsorption/precipitation | |
| - scaling | adsorption/precipitation | |
| - excessive HTI | adsorption/precipitation | |
| - increase in suspended solids | adsorption | |
| Phosphonate is consumed due to the following processes: | | |
| - scaling | adsorption | |
| - reversion to ortho-PO4 | degradation | |
| - mild steel corrosion | adsorption/precipitation | |
| - excessive overfeed of halogen based biocides (e. g. chlorine) | degradation | |
| - excessive HTI | adsorption/precipitation/degradation | |

FIG. 4B
Zinc

| General Trends: | | | | | | | | | | | |
|---|---|---|---|---|---|---|---|---|---|---|---|
| - scaling | | | adsorption/precipitation | | | | | | | | |
| - mild steel corrosion | | | adsorption/precipitation | | | | | | | | |
| - increased scale-forming ions due to makeup (iron, PO4, Al, ...) | | | adsorption/precipitation | | | | | | | | |
| - microbio upsets | | | metabolized into biomass | | | | | | | | |
| - excessive HTI | | | adsorption/precipitation/degradation | | | | | | | | |
| Triazole is consumed due to the following processes: | | | | | | | | | | | |
| - excessive overfeed of halogen based biocides (e.g. chlorine) | | | degradation | | | | | | | | |
| - microbio upsets | | | metabolized by biomass | | | | | | | | |
| - copper (alloy):corrosion | | | adsorption | | | | | | | | |
| - excessive HTI | | | adsorption/degradation | | | | | | | | |

FIG. 5A
All Organic

| System Conditions Leading to Stress | Possible Performance Problem | tracer level | Dispersant Polymer | PBTC (Phosphonate) | HEDP (Phosphonate) | Triazoles | Corrective Actions |
|---|---|---|---|---|---|---|---|
| Over-chlorination (high residual) | Degradation, scale & corrosion | 0 | 1 | 0 | 1 | 1 | Increase treatment dosage, prevent halogen overfeed, decrease cycles/increase blowdown (as needed) |
| Microbiological upsets | Fouling, PO4/etc. metabolized | 0 | 1 | 0 | 0 | 1 | Increase treatment dosage, optimize microbio/biocide control |
| Variable/High PO4 in MU | Scale | 0 | 1 | 0 | 0 | 0 | Decrease cycles/increase blowdown, increase dispersant polymer dosage |
| Excessive overfeed of treatment | Scale | increase | 1 | 0 | 1 | 0 | Turn off treatment feed, increase blowdown/decrease cycles |
| Loss of treatment feed | Scale & Corrosion | decrease | 1 | 1 | 1 | 1 | Fix pump, trim pump on greater % of time, fix dosage control equipment, slug-feed additional amount of product |
| Overcycling (No change in MU water quality) | Scale, Degradation | 0 | 1 | 1 | 1 | 1 | Increase blowdown/decrease cycles, increase treatment dosage |
| High/Variable HTI | Degradation, scale & corrosion | 0 | 1 | 1 | 1 | 1 | Decrease cycles/increase blowdown, increase treatment dosage, use treatment w/less tendency to revert/degrade over time |
| Excessive overfeed of treatment | Corrosion | increase | 1 | 0 | 0 | 1 | Turn off treatment feed, increase blowdown |
| Low pH | Corrosion (should it occur) | 0 | 1 | 0 | 0 | 1 | Fix acid pump/decrease acid feed, decrease cycles/increase blowdown, increase treatment dosage |
| Low alkalinity | Corrosion | 0 | 1 | 0 | 0 | 1 | Fix acid pump/decrease acid feed, decrease cycles/increase blowdown, increase treatment dosage |
| | | | 1 | 1 | 1 | | Increase treatment dosage, eliminate process leaks, contingency feed of oil dispersant, decrease cycles/increase blowdown |
| Process Leaks | Fouling | 0 | | | | 0 | |

FIG. 5B
All Organic

| System Conditions Leading to Stress | Possible Performance Problem | tracer level | Dispersant Polymer | PBTC (Phosphonate) | HEDP (Phosphonate) | Triazoles | Corrective Actions |
|---|---|---|---|---|---|---|---|
| Process Leaks | Corrosion | 0 | 1 | 0 | 0 | 1 | Increase treatment dosage, eliminate process leaks, contingency feed of oil dispersant, decrease cycles/increase blowdown |
| Recirculation water as chlorinator drive water | Degradation, scale & corrosion | 0 | 1 | 1 | 1 | 1 | Increase treatment dosage, change chorinator drive-water to makeup water |
| High alkalinity | Scale | 0 | 1 | 1 | 1 | 0 | Fix acid pump/increase acid feed (if used), decrease cycles/increase blowdown, increase treatment dosage |
| High pH | Scale | 0 | 1 | 1 | 1 | 0 | Fix acid pump/increase acid feed (if used), decrease cycles/increase blowdown, increase treatment dosage |
| High heat flux, high skin or water temp. (skin >150F, water >120F) | Scale | 0 | 1 | 1 | 1 | 0 | Increase dispersant polymer dosage, fix any mechanical-design problems |
| Iron contamination in MU | Fouling | 0 | 1 | 0 | 0 | 0 | Decrease cycles/increase blowdown, increase dispersant polymer dosage, contingency feed of iron dispersant |
| High suspended solids | Fouling | 0 | 1 | 0 | 0 | 0 | Increase dispersant polymer dosage, fix clarifier/adjust coagulant/flocculant feedrate, decrease cycles/increase blowdown |
| Boiler blowdown as MU | Scale | 0 | 1 | 0 | 0 | 0 | Decrease boiler blowdown to cooling tower, increase dispersant polymer dosage |
| Al carryover | Fouling | 0 | 1 | 0 | 0 | 0 | Increase dispersant polymer dosage, reduce Al content in makeup water |

FIG. 5C
All Organic

| System Conditions Leading to Stress | Possible Performance Problem | tracer level | Dispersant Polymer | PBTC (Phosphonate) | HEDP (Phosphonate) | Triazoles | Corrective Actions |
|---|---|---|---|---|---|---|---|
| Low cycles | Dissolution of existing scale | 0 | -1 | -1 | -1 | 0 | Decrease blowdown/increase cycles, decrease treatment dosage |
| Low pH | Dissolution of existing scale & protective films | 0 | -1 | -1 | -1 | -1 | Fix acid pump/decrease acid feed (if used), decrease cycles/increase blowdown |

FIG. 6
All Organic

General Trends:

Dispersant Polymer is consumed due to the following processes:
- scaling — adsorption
- corrosion — adsorption, precipitation
- increase in suspended solids — adsorption
- increased scale-forming ions due to makeup (iron, PO4, Al,...) — adsorption, precipitation
- excessive overfeed of halogen based biocides (e.g. chlorine) — degradation
- excessive HTI — adsorption/precipitation/degradation

Phosphonate (HEDP, PBTC) is consumed due to the following processes:
- scaling — adsorption
- reversion to ortho-PO4 — degradation (HEDP >> PBTC)
- mild steel corrosion — adsorption, precipitation
- excessive overfeed of halogen based biocides (e.g. chlorine) — degradation (HEDP >> PBTC)
- excessive HTI — adsorption/precipitation/degradation (HEDP >> PBTC)

Triazole is consumed due to the following processes:
- excessive overfeed of halogen based biocides (e.g. chlorine) — degradation
- microbio upsets — metabolized by biomass
- copper (alloy) corrosion — adsorption
- excessive HTI — adsorption/degradation

FIG. 7

Recommended Program Limits --- will be situation & treatment dosage-dependent

| | All-Organic | Zinc | Stabilized PO4 |
|---|---|---|---|
| Treatment Product Dosage/Actives | | | |
| Product Dosage (ppm product) | 30-120 (dispersant treatment), 40-60 (org. P treatment) | 30-155 (dispersant treatment), 3-150 (zinc treatment) | 20-160 (dispersant treatment), 75-100 (phosphate treatment) |
| Polymer | Verify polymer level | Verify polymer level | Verify polymer level |
| Org. P (ppm as PO4) | N/A? | | 4.8-7.2 |
| Zinc (ppm as Zn) | 1 | 10 | 10 |
| Ortho PO4 (ppm as PO4) | 4 | 35 | 55 |
| Inorganic P (ppm as PO4) | 3 | --- | --- |
| Condensed "Poly" PO4 (ppm as PO4) | --- | --- | >2 |
| Free residual chlorine (ppm as Cl2) | 0.2-0.5 | 0.2-0.5 | 0.2-0.5 |
| Water Quality | | | |
| pH | 8.5-9.2 | 7.2-9.0 | 6.8-8.0 |
| M-Alkalinity (ppm as CaCO3) | 250-500 | 50-400 | 15-200 |
| PO4 in makeup (ppm as PO4) | [4 - (PO4 from treatment)]/cycles | [35 - (PO4 from treatment)]/cycles | [55 - (PO4 from treatment)]/cycles |
| Microbio (CFU's/cm) | ≤10,000 | ≤10,000 | ≤10,000 |
| Cycles | depends on makeup water quality | depends on makeup water quality | depends on makeup water quality |
| Ca+2 (ppm as CaCO3) | 50-850 | 15-1200 | 15-1500 |
| Mg+2 (ppm as CaCO3) | dependent on pH/SiO2 | dependent on pH/SiO2 | dependent on pH/SiO2 |
| Total Hardness (ppm as CaCO3) | dependent on Ca+2 + Mg+2 | dependent on Ca+2 + Mg+2 | dependent on Ca+2 + Mg+2 |
| Iron (ppm as Fe) | 4 | 8 | 8 |
| Suspended Solids (or Turbidity) | 50 NTU | 75 NTU | 75 NTU |
| Al+3 (ppm as Al) | 0.5 | 2 | 2 |
| Boiler blowdown as Makeup | may contain polymer incompatible w/CW | may contain polymer incompatible w/CW | may contain polymer incompatible w/CW |
| System Operation | | | |
| HTI (hours) | 60 | 225 | 250 |
| Highest H2O Temp. @ H-E Outlet (deg F) | 135 | 180 | 180 |

USE OF CONTROL MATRIX FOR COOLING WATER SYSTEMS CONTROL

FIELD OF THE INVENTION

This invention is in the field of cooling water systems. Specifically, it is in the field of control of cooling water systems.

BACKGROUND OF THE INVENTION

A cooling water system comprises a cooling tower, heat exchangers, pumps and all necessary piping to move water through the system. Control of a cooling water system is based on the balancing the desire to run the cooling water system at the highest concentration cycles possible without incurring detrimental scaling, corrosion, fouling or microbiological control patterns.

A concentration cycle is defined for a specific species as:

Specific Species Level in Cooling Water Tower

Specific Species Level in Make-Up Water

When the specific species is the calcium ion ($Ca^{+2}$), if a concentration cycles is running at 500 ppm $Ca^{+2}$ with 150 ppm $Ca^{+2}$ in the makeup water, the cooling water system is running at 3.3 concentration cycles. In operating a cooling water system it is desirable to achieve the maximum number of concentration cycles to avoid unnecessary loss of water in blowdown as well as unnecessary overfeeding of treatment chemicals, including but not limited to treatment polymers. The maximum concentration cycles for a cooling water system are limited by the undesirable events, such as scaling and corrosion, which occur when the amount of specific species in the cooling water tower reaches a certain level, such that the species contributes to these problems.

There are several currently known ways used to control a cooling water system. Controlling the concentration cycles is typically done by controlling the flow rate of "fresh" water (from one or more sources) known as make-up water into the system and by controlling the main flow rate out of the system, referred to as blowdown. In order to control makeup water flow, a pump or valve controls the flow of make-up water into the cooling tower and a level controller is typically used in the cooling tower reservoir or "sump". The level controller is linked to the make-up water pump or valve and when the water in the sump decreases to a point lower than the setpoint for the level controller the make-up water pump is activated.

Conductivity is the typical method of control of blowdown. Conductivity is the measuring of electrical conductivity of water with electrical conductivity being present in the water due to ionic species being present in the water. Conductivity can be used to control bleed of blowdown because conductivity can readily be used to estimate the overall amount of ionic species present in the water, and a simple controller can be set to open a valve or pump and start blowdown when the conductivity of the reservoir water reaches above a certain setpoint. There are limits to how useful conductivity is for control of a cooling water system as conductivity is nothing more that an indirect measure of the amount of ionic species present. Therefore, conductivity cannot provide information about scaling tendency or actual scaling and use of conductivity can cause "catastrophic failure", where scaling causes the cooling water system to overcycle and scale further.

Alternatively, a timer can control bleed of blowdown without actually measuring any of the ingredients in the water. In addition to or in place of the above control schemes, water flow meters on the make-up and blowdown can be used, sometimes in conjunction with a microprocessor controller to do an overall cooling water mass balance.

A problem with these known control schemes, is that when the blowdown is controlled by conductivity and the make-up is controlled by the level controller, if the composition of the usual make-up water is variable, or if there are alternate sources of make-up water that are significantly different from the usual make-up water source, level controllers and conductivity cannot account for everything that is occurring in the system. In these cases, the cooling water system is typically controlled by the operator being conservative with the conductivity setpoint which thus causes extra undesirable expense due to non-optimal use of treatment chemicals and water.

Many cooling water systems use treatment products to control undesirable events such as scaling, corrosion, fouling and microbiological growth. These treatment products comprise polymers and other materials and are known to people of ordinary skill in the art of cooling water systems. A cooling water system can be set up to feed treatment product based on either a bleed/feed mechanism where the action of blowdown triggers a chemical feed pump or valve that feeds treatment product; or, in the alternative, the cooling water system feeds treatment product based on timers using a "feeding schedule" or flow meters on the make-up water line trigger the pumping of treatment product based on a certain amount of make-up water being pumped. A limitation of these control methods is that none of these systems measure the treatment product concentration directly online, so if there is a mechanical problem, for example, if a pump fails, a drum empties, or high, low or unknown blowdown occurs, system volume changes or makeup water quality changes; the correct treatment product concentration is not maintained. Because this problem is common, typically cooling tower systems are either overfed to ensure the level of treatment product in the system does not drop too low as a result of high variability in product dosage or the treatment product is unknowingly underfed. Both overfeeding and underfeeding of treatment product are undesirable due to cost and performance drawbacks.

One aspect of known control schemes is an inert fluorescent chemical being added to the cooling water system in a known proportion to the active component of the treatment product feed and the use of a fluorometer to monitor the fluorescent signal of the inert fluorescent chemical. This is commercially available as TRASAR®. TRASAR® is a registered trademark of Nalco Chemical Company One Nalco Center, Naperville Ill. 60563 (630) 305-1000). The fluorescent signal of the inert fluorescent chemical is then used to determine whether the desired amount of treatment product is present in the cooling tower (and to control blowdown).

Many current cooling towers use inert fluorescent tracers to control the treatment product level in the system and also use a conductivity controller to measure the conductivity in the water.

Cooling towers that use both inert tracer(s) and conductivity typically use the following types of information in order to control the tower. For example a cooling tower with typical makeup water having: 150 ppm $Ca^{+2}$, 75 ppm $Mg^{+2}$, and 100 ppm "M alkalinity"; with a conductivity of 600 $\mu$S/cm (Note that conductivity is expressed in units of microsiemens per centimeter), the system is set to run at 500 ppm $Ca^{+2}$. In order to operate within acceptable levels, the cycle of concentration for this cooling water system is 3.3 (calculated by dividing 500 by 150). Running the system at 500 ppm $Ca^{+2}$ corresponds to a conductivity setpoint of 3.3 times 600 or 1980 $\mu$S/cm. When the conductivity exceeds this setpoint the system is configured to automatically blowdown a portion of "concentrated" water ("concentrated" referring to system water with an unacceptably high level of ions) which is replaced with "fresh" makeup water (where "fresh" is defined as having a lower level of scaling ions than the "concentrated" cooling water). This decreases the conductivity and hardness ($Ca^{+2}$ and $Mg^{+2}$) ions via dilution. Dilution also reduces the amount of inert tracer and treatment chemical in the system. Decreasing the amount of inert tracer in the system, decreases the fluorescent signal from the inert tracer. When the fluorescent signal from tracer decreases, the tracer control system is set up to feed a fresh mixture of treatment product and inert tracer chemical to compensate for the decrease in inert fluorescent tracer and treatment chemical that was lost in the blowdown.

A known method of control of product feed to a cooling water system involves the use of another aspect of tracer technology. This involves using a treatment product containing a polymer that has been "tagged" with a fluorescent moiety. These tagged treatment polymers, are not inert, rather, they are supposed to be consumed as they function to treat whatever performance-related condition it is that they are designed to treat. Thus, by measuring the fluorescent signal of the tagged treatment polymer it is possible to determine the amount of consumption of the tagged treatment polymer. By knowing the amount of consumption of the tagged treatment polymer it is possible to use that information to control the feeding of new treatment product containing tagged treatment polymer.

New methods and techniques for control of cooling water systems are always desirable.

SUMMARY OF THE INVENTION

The instant claimed invention is a method of controlling a cooling water system in which control is based on information from a control Matrix applicable to the specific operating parameters of said cooling water system comprising:

(i) providing a suitable fluorometer, sufficient analytical devices and a suitable controller;

(ii) programming said suitable fluorometer and controller using planning information from a control Matrix for cooling water systems being treated with treatment programs selected from the group consisting of:
(a) stabilized phosphate,
(b) zinc, and
(c) all organic;

(iii) using said fluorometer and sufficient analytical devices to determine the status of system factors;

(iv) determining the pattern of changes in the readings from step (iii) over time;

(v) comparing the changes in readings in steps (iii) and (iv), with the information listed in the control Matrix to determine what corrective action(s) is recommended; and (vi) using said controller to automatically implement said corrective action(s).

BRIEF DESCRIPTION OF THE DRAWINGS

FIG. 1A and FIG. 1B and FIG. 1C show a control Matrix for a cooling water system treated with a "Stabilized Phosphate" treatment program.

FIG. 2A and FIG. 2B show the General Trends for the manner of consumption for the components consumed in a "Stabilized Phosphate" treatment program.

FIG. 3A and FIG. 3B show a control Matrix for a cooling water system treated with a "Zinc Containing" treatment program.

FIG. 4A and FIG. 4B show the General Trends for the manner of consumption for the components consumed in a "Zinc Containing" treatment program.

FIG. 5A and FIG. 5B and FIG. 5C show a control Matrix for a cooling water system treated with an "All Organic" treatment program.

FIG. 6 shows the General Trends for the manner of consumption for the components consumed in an "All Organic" treatment program.

FIG. 7 is a typical "Recommended Program Limits" chart for an "All-Organic", "Zinc", and "Stabilized Phosphate" treatment program.

DETAILED DESCRIPTION OF THE INVENTION

The invention is a method of controlling a cooling water system in which control is based on information from a control Matrix applicable to the specific operating parameters of said cooling water system comprising:

(i) providing a suitable fluorometer, sufficient analytical devices and a suitable controller;

(ii) programming said suitable fluorometer and controller using planning information from a control Matrix for cooling water systems being treated with treatment programs selected from the group consisting of:
(a) stabilized phosphate,
(b) zinc, and
(c) all organic;

(iii) using said fluorometer and sufficient analytical devices to determine the status of system factors;

(iv) determining the pattern of changes in the readings from step (iii) over time;

(v) comparing the changes in readings in steps (iii) and (iv), with the information listed in the control Matrix to determine what corrective action(s) is recommended; and (vi) using said controller to automatically implement said corrective action(s).

A suitable fluorometer and controller for use in conducting the method of the instant claimed invention is described and claimed in U.S. patent application Ser. No. 09/563,086, entitled, "MODULAR FLUOROMETER AND METHOD OF USING SAME TO DETECT ONE OR MORE FLUOROPHORES", filed May 1, 2000, now pending, herein incorporated by reference in its entirety. The fluorometer described and claimed therein is capable of measuring anywhere from one to sixteen separate fluorescent signals. The controller described therein is capable of using input from the fluorometer and other analytical devices, processing this input according to program and applying control signals to the pumps and valves of a cooling water system.

Sufficient analytical devices are the number of analytical devices required to analyzed those system factors known to persons of ordinary skill in the art of cooling water systems as being important. Those system factors include, but are not limited to:

pH;

Conductivity;

Oxidation-reduction potential or "ORP";

additional chemical monitors of water quality for such factors including, but not limited to, calcium, magnesium, total hardness, iron, copper, chloride, sulfate, manganese, aluminum, silica, alkalinity, ammonia, phosphate, turbidity, total suspended solids; process leaks;

free residual & total oxidant/halogen/chlorine;

non-fluorescent or fluorescent-based monitors of treatment actives such as dispersant polymer, zinc, molybdate, phosphate, condensed inorganic phosphates, phosphonates, and triazoles;

water temperatures;

process-side temperatures, taken at various places in the system to help determine exchanger efficiency and fouling;

treatment actives;

fluid flowrates;

fluid velocities;

fluid pressures and differential pressures;

chemical inventories and depletion thereof;

pumping rates;

blowdown rates;

makeup water flowrate;

corrosion monitors;

fouling/deposit monitors;

microbiological indicators; and light absorbance of substances in water.

Analytical devices capable of monitoring the above-described factors are known in the area of cooling water systems.

FIGS. 1A, 1B, and 1C show the control Matrix for a cooling water system where a "Stabilized Phosphate" treatment program is being used. A "Stabilized Phosphate" treatment program is recognized by people of ordinary skill in the art of cooling water systems to be a treatment formulation comprising dispersant polymer, orthophosphate, pyrophosphate, phosphonate, triazole and an inert fluorescent tracer.

FIGS. 3A and 3B show the control Matrix for a cooling water system where a "Zinc Containing" treatment program is being used. A "Zinc Containing" treatment program is recognized by people of ordinary skill in the art of cooling water systems to be a treatment formulation comprising zinc cation, dispersant polymer, phosphonate, orthophosphate, organic triazole and an inert fluorescent tracer.

FIGS. 5A, 5B and 5C show the control Matrix for a cooling water system treated with an "All Organic" treatment program. An "All Organic" treatment program is recognized by people of ordinary skill in the art of cooling water systems to contain only organic-based treatment actives. Therefore, an All Organic treatment program would comprise organic polymers, organic phosphonates and organic triazoles, and would not include actives based on heavy metals, such as molybdate and inorganic ions such as ortho phosphate. This type of program is also typically used under high-pH conditions (8.5 or higher) and with minimal control of pH with acid.

The left-hand columns in FIGS. 1A–C, 3A and B and 5A–C are a list of System Conditions Leading to Stress that could occur in the cooling water system.

"Over-Chlorination" (high residual) refers to excessive levels of chlorine gas (or bleach) or other halogen-based oxidizing biocides, which are higher than is needed for microbiological control and can react with and degrade treatment actives. This also refers to biocide feedpoints where excessive localized concentrations of oxidizing biocides can exist.

"Microbiological Upsets" refers to formation of biofilm and excessive levels of planktonic bacteria that exceed specified limits (e.g. >$10^3$ CFUs/mL).

"Variable/High orthoPO4 in MU(make-up water)": variable PO4 refers to changes in make-up water composition or changes between makeup water source. High PO4 refers to levels of orthoPO4 in MU which would cause treatment program or performance limits to be exceeded when the PO4 cycles up in cooling tower.

"Loss of treatment feed" refers to when product supply runs out or product decreases to the point at which performance is adversely affected. Product decreases, or low product dosages, mean lower than specified by product application recommendations or by the cooling water system operator for level of chemical feed equipment.

"Overcycling" refers to excessive ratio of makeup/blowdown which leads to overstressing of system/treatment programs thru excessive levels of hardness/alkalinity, HTI, fouling ions (e.g. iron, etc.).

"High/Variable HTI" refers to excessive holding time index ("HTI"). The HTI is the time required for 50% removal/replacement of substance from the system. Treatment programs often have HTI limit recommendations.

"Overfeed of product" refers to levels of product which are higher than specified by program recommendations or by the cooling water system operator.

"Low pH" is understood by referring to the general ranges for pH given in FIG. 7. It is understood that the operating range for pH for a specific program can be much narrower values within that range. Thus low pH depends upon the rest of the operating conditions for the specific cooling water system.

"Low alkalinity" refers to "M-alkalinity" in FIG. 7.

"Process leaks" refer to contaminants from the process that is being cooled by the cooling water, which inadvertently enter the cooling water.

"Recirculation water as chlorinator drive water" refers to mixing cooling tower water with high levels of chlorine.

"High alkalinity" refers to high concentration of $HCO_3^-$ and $CO_3^-$ above a prescribed range; for example 50–200 ppm as $CaCO_3$.

"High pH" is understood by referring to the general ranges for pH given in FIG. 7. It is understood that the operating range for pH for a specific program can be much narrower values within that range. Thus high pH depends upon the rest of the operating conditions for the specific cooling water system.

"High heat flux, high skin or water temperature" is related to the temperature which can occur on the metal heat-exchange surfaces on the water-side of the exchangers. Refer to Highest H2O Temp @ H-E outlet (deg F.) in FIG. 7.

"Iron contamination in MU water" refers to Fe>0.2 ppm.

"High suspended solids" refers to FIG. 7.

"Boiler blowdown as MU water" refers to the use of boiler blowdown water, treated with various chemicals, which chemicals could then be antagonistic toward cooling water treatments, for more information, see FIG. 7.

"Al carryover" refers to contamination of cooling water in the system due to $Al^{+3}$ from make-up water or from improper clarification with Al-containing coagulant. See FIG. 7.

"Low Cycles" refers to low cycles of concentration resulting from excessive blowdown or excessive addition of make-up water.

In FIGS. 1A–C, 3A and B and 5A–C the second column from the left describes, "Possible Performance Problems". The next six columns in FIGS. 1A–C and 3A and B, and the next five columns in FIGS. 5A, 5B and C describe what happens to each identified component during the system conditions leading to stress. The code used in these columns is as follows:

"+1" means an increase in consumption of this material is observed.

"–1" means a decrease in consumption of this material is observed.

"0" means that during the particular condition the consumption of this material is unchanged.

The last column in FIGS. 1A–C, 3A and B and 5A–C show the "Corrective Actions" that can be taken to deal with the "Possible Performance Problems" caused by the system conditions leading to stress.

The information in these control Matrices can be used to program a controller that acts to automatically implement the desired corrective action, upon registering that a listed condition or a combination of listed conditions have occurred.

FIGS. 2A and 2B show the manner of consumption for the components consumed in a "Stabilized Phosphate" treatment program. This information is the basis for certain parts of the logic expressed in the control Matrix for the cooling water system being treated with a stabilized phosphate program.

FIGS. 4A and 4B show the manner of consumption for the components consumed in a "Zinc Containing" treatment program. This information is the basis for certain parts of the logic expressed in the control Matrix for the cooling water system being treated with a zinc containing treatment program.

FIG. 6 shows the manner of consumption for the components consumed in an "All Organic" treatment program. This information is the basis for certain parts of the logic expressed in the control Matrix for the cooling water system being treated with a All Organic containing treatment program.

FIG. 7 is a "Recommended Program Limits" chart for an "All-Organic", "Zinc", and "Stabilized Phosphate" treatment program. This information is the basis for certain of the limits used to program the controller using information from the control Matrix and using measured analytical results.

The advantage of the control Matrix method of control of a cooling water system is that it provides a comprehensive control scheme for automatic control of a cooling water system.

The following examples are intended to be illustrative of the present invention and to teach one of ordinary skill how to make and use the invention. These examples are not intended to limit the invention or its protection in any way.

EXAMPLES

EXAMPLE 1

In a cooling tower, a stabilized phosphate-type treatment program is being used. The treatment contains an inert fluorescent tracer (for product dosage control and as a reference point), orthophosphate, dispersant polymer, pyrophosphate, phosphonate, and triazole. The cooling water system uses sulfuric acid for pH control and has a water chemistry that is controlled at or near the following conditions.

| | |
|---|---|
| pH | 7.0 |
| supply water temperature (° F.) | 100 |
| return water temperature (° F.) | 110 |
| calcium (ppm as $CaCO_3$) | 400 |
| magnesium (ppm as $CaCO_3$) | 200 |

All of these materials are commercially available and are known to persons of ordinary skill in the art of cooling water systems.

The water also contains sulfate, chloride, small amounts of M-alkalinity, and other dissolved ions. The dosage levels of the treatment program and the active components of the treatment program are measured. Under typical to moderately stressed operating conditions, the dosage of the treatment program is controlled using the inert tracer readings. The consumption of each active treatment component is also measured by comparing the inert tracer readings and the dosages of active treatment components.

A system upset occurs where the feed of sulfuric acid used to control pH of the cooling tower is interrupted. During that high pH upset, an increase in the scaling potential of the system occurs and increased consumption of some of the treatment actives (dispersant polymer, orthophosphate, and phosphonate) occurs. The expected increase in consumption of certain treatment actives is designated by the symbol "1" in FIGS. 1A, 1B and 1C showing consumption of treatment actives versus upset/stress condition in system operation. The symbol "0" in FIGS. 1A, 1B and 1C indicates that no significant change in consumption of treatment actives is expected for a certain type of system stress/upset and operating problem. The symbol "–1" in FIGS. 1A, 1B and 1C indicates that there is a decrease in the consumption of treatment actives.

Based on the analytical readings showing:

(1) no change in inert fluorescent tracer level for product dosage, (2) increased consumption of polymer, ortho-PO4, pyrophosphate and phosphonate, and (3) no change in triazoles;

it is determined from consulting the control Matrix for Stabilized Phosphate and the consumption write-up for Stabilized phosphate (FIGS. 1A, 1B, and 1C) that the problem could be due to any or all of the following:

(A) high pH due to failure of acid feed system;

(B) high alkalinity;

(C) process leaks.

Because more than one problem could lead to the same matrix combination, these results can also be cross-checked with an additional input such as pH meter reading which is done and found to be high. All of these results confirm that failure of acid feed system is occurring.

Corrective actions are then implemented in order to return the systems water chemistry to specified ranges as follows:

(i) Increase blowdown rate and decrease cycles of concentration, (ii) Increase product dosage, and (iii) Fix acid feed system.

Upon implementation of one or more of these actions, the performance problem is minimized, the treatment chemistry/actives consumption and water chemistry return to normal and the problem is fixed and the actives consumption/matrix results confirm the treatment problem is corrected. Each and every one of these processes occur much quicker and better with this analysis and corrective action and programming technique as compared to separate analysis and manual measurements, connections or other available techniques.

EXAMPLE 2

In a cooling tower, a zinc program known as an "alkaline-zinc" type program is being used. The treatment contains an inert fluorescent tracer (for product dosage control and as a reference point), orthophosphate, dispersant polymer, phosphonate, zinc, and triazole. The cooling water system uses sulfuric acid for pH control and has a water chemistry that is controlled at or near the following conditions.

| | |
|---|---|
| pH | 8.5 |
| Supply water temperature (° F.) | 110 |
| Return water temperature (° F.) | 120 |
| Calcium (ppm as $CaCO_3$) | 600 |
| Magnesium (ppm as $CaCO_3$) | 250 |

All of these materials are commercially available and are known to persons of ordinary skill in the art of cooling water systems.

The water also contains sulfate, chloride, M-alkalinity, and other dissolved ions. The dosage levels of the treatment program and the active components of the treatment program are measured using standard analytical techniques. Under typical operating conditions, the dosage of the treatment program is controlled using the inert tracer readings. The consumption of each active treatment component is also measured by comparing the inert tracer readings and the dosages of active treatment components.

A system upset occurs when the blowdown rate increases significantly, which results in low cycles of concentration in the cooling water system feed. During that low cycles upset, a decrease in the scaling potential of the cooling water system occurs and also the analytical readings indicate:

(1) A decrease in the level of consumption of certain treatment actives (dispersant polymer, orthophosphate, zinc, and phosphonate); which is designated by a "−1" symbol in FIGS. 3A and 3B.

(2) the consumption level of triazole is not significantly changed by the change in the operating conditions (which is designated by a "0" symbol in FIGS. 3A and 3B).

(3) No change in the level of inert fluorescent tracer, which determines product dosage.

It is determined from the control Matrix for a cooling water system being treated by a zinc treatment program (FIGS. 3A and 3B) that the problem is "low cycles of concentration" as no other stress/problem condition in that matrix provided that pattern of inert tracer and consumption of treatment actives behavior. However, an additional analysis probe (e.g., conductivity) could be used to further substantiate the root-cause of the problem. Based on the analytical results and consulting the control Matrix, corrective actions are identified and taken to solve the problem as follows:

(i) Blowdown rate is decreased or shut off entirely and (ii) Treatment dosage is decreased to compensate for low cycles of concentration and high levels of actives which can occur from dissolution of scale and deposition.

If the two steps above do not correct the problem (e.g., if blowdown control is broken so that blowdown cannot be shut-off until repairs are made), then the controller will properly indicate that automatically activated corrective responses are not completely sufficient to prevent the problem and a higher level of corrective response (repair the blowdown line) is needed.

Upon implementation of one or more of these corrective actions the performance problem is minimized and the treatment chemistry/actives consumption and water chemistry return to normal. The problem is fixed and subsequent analysis of the inert tracer/actives/actives consumption levels confirms that the problem is corrected. As with the work described in Example 1, each and every one of the analytical results, problem identification, problem-solving, and confirmation that corrective was effective occurred much quicker and much more effectively with the claimed invention as compared to manual measurements/corrections or alternative techniques.

EXAMPLE 3

In a cooling tower, an "All Organic" type treatment program is being used. The treatment contains an inert fluorescent tracer (for product dosage control and as a reference point), dispersant polymer, phosphonates and triazole. The cooling water system often does not use acid for pH control and has a water chemistry that is controlled at or near the following conditions.

| | |
|---|---|
| pH | 9.2 |
| Supply water temperature (° F.) | 105 |
| Return water temperature (° F.) | 115 |
| Calcium (ppm as $CaCO_3$) | 550 |
| Magnesium (ppm as $CaCO_3$) | 200 |

All of these materials are commercially available and are known to persons of ordinary skill in the art of cooling water systems.

The water also contains sulfate, chloride, M-alkalinity, and other dissolved ions. The dosage levels of the treatment program and the active components of the treatment program are measured. Under typical operating conditions, the dosage of the treatment program is controlled using the inert tracer readings. The consumption of each active treatment component is also measured by comparing the inert tracer readings and the dosages of active treatment components.

A system upset occurred with high suspended solids in makeup water, which then result in high suspended solids in the cooling water. During that high suspended solids upset the analytical results indicated:

(1) An increase in the level of consumption for dispersant polymer (which is designated by a "1" symbol in FIG. 5A and FIG. 5B and FIG. 5C.

(2) The consumption level of triazole and phosphonates are not significantly affected by the change in the operating conditions (which is designated by a "0" symbol in FIGS. 5A, 5B and 5C.

(3) No change in the level of inert fluorescent tracer, which determines product dosage. It is determined from the consumption pattern and the inert tracer readings from the control Matrix in FIGS. 5A, 5B and 5C that the system performance problem which is consuming the dispersant could be:

(A) High suspended solids,
(B) Variable/High ortho-PO4 in makeup,
(C) Iron contamination in makeup water, or
(D) Boiler blowdown being used as makeup in cooling water An additional analysis probe (e.g., turbidimeter) can be used to further substantiate the root-cause of the problem as being high suspended solids. Based on the analytical results and the matrix pattern, corrective actions are taken to solve the problem as follows:

(i) Increase dispersant polymer dosage,
(ii) Adjust pretreatment of the makeup water (e.g., clarifier operation or coagulant/flocculant used in makeup water), and
(iii) Increase blowdown rate to reduce concentration cycles and level of suspended solids in cooling water.

Upon implementation of one or more of these corrective actions—the performance problem is minimized and the treatment chemistry/actives consumption and water chemistry returned to normal. The problem is fixed and subsequent analysis of the inert tracer/actives/actives consumption levels confirmed that the problem is corrected. As with the past two examples, each and every one of the analytical results, problem identification, problem-solving, and confirmation that corrective is effective occur much quicker and much more effectively with the claimed invention as compared to manual measurements/ corrections or alternative techniques.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of controlling a cooling water system in which control is based on information from a control Matrix applicable to the system conditions leading to stress of said cooling water system comprising:

(i) providing one or more fluorometers, analytical devices and a controller;

(ii) programming said one or more fluorometers, analytical devices and a controller using planning information from a control Matrix for cooling water systems being treated with treatment programs selected from the group consisting of:
(a) Stabilized Phosphate;
(b) Zinc; and
(c) All Organic;

(iii) using said one or more fluorometers and analytical devices to determine the status of system conditions leading to stress;

(iv) determining the pattern of changes in the status of system conditions leading to stress from step (iii) over time;

(v) comparing the changes in the status of system conditions leading to stress in steps (iii) and (iv), with patterns listed in the control Matrix to determine what corrective action(s) is/are recommended; and (vi) using said controller to automatically implement what corrective action(s) is/are recommended.

* * * * *